United States Patent Office 3,257,391
Patented June 21, 1966

3,257,391
6-SUBSTITUTED RING A AROMATIC STEROIDS
Albert Bowers and Otto Halpern, Mexico City, Mexico, assignors to Syntex Corporation, Panama, Panama, a corporation of Panama
No Drawing. Filed Dec. 11, 1963, Ser. No. 329,857
Claims priority, application Mexico, Mar. 27, 1963, 71,419
20 Claims. (Cl. 260—239.55)

The present invention relates to a novel process for making cyclopentanoperhydrophenanthrene derivatives and to certain novel compounds obtained by this method.

More particularly the present invention relates to a process for making 3-hydroxy ring A aromatic steroids of the androstane, pregnane and sapogenin series, which may be further substituted at C–6 by a lower alkyl, alkenyl or alkinyl groups, from the corresponding $\Delta^{1(10),5}$-3-hydroxy steroids, as well as to the novel 6-substituted derivatives.

The novel compounds obtained by our methods are represented by the following formulas:

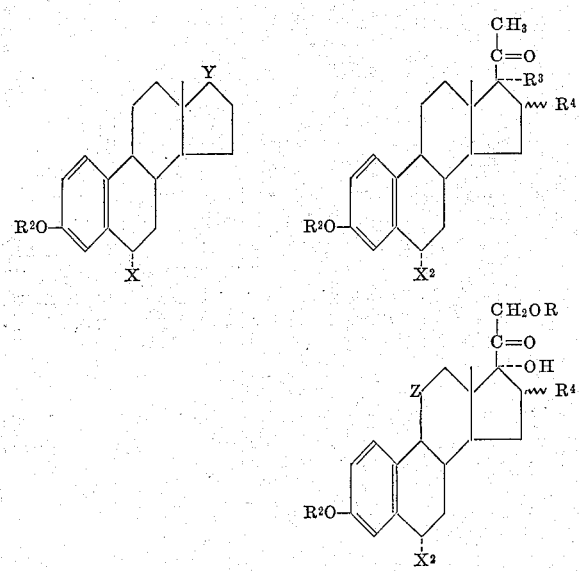

In the above formulas Y represents a keto group or the grouping

whereas R represents hydrogen or an acyl radical of less than 12 carbon atoms and $R^1$ represents hydrogen, a lower alkyl, lower alkenyl or lower alkinyl; $R^2$ represents hydrogen, lower alkyl or an acyl group as hereinafter defined; $X^1$ represents a lower alkyl, alkenyl or alkinyl radical of 2 to 6 carbon atoms, inclusive; $X^2$ represents a lower alkyl, alkenyl or alkinyl radical of up to 6 carbon atoms such as methyl, ethyl, propyl, vinyl, ethinyl or propargyl; $R^3$ represents hydrogen, hydroxy or acyloxy; $R^4$ represents hydrogen, α-methyl, β-methyl, α-hydroxy or α-acyloxy; $R_4$ together with the hydroxyl group at C—17α may also represent the radical

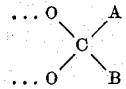

wherein A represents hydrogen or a lower alkyl radical and B represents a lower alkyl, an aryl or aralkyl radical containing up to 10 carbon atoms, and Z represents hydrogen, β-hydroxy or a keto group.

The acyl and acyloxy groups above referred to are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, zenzoate, trimethylacetate, t-butyl-acetate, phenoxyacetate, cyclopentylpropionate, aminoacetate, and β-chloropropionate.

The novel compounds of the invention are estrogenic type hormones which show anti-androgenic action and a relatively small feminizing affect. They are useful in fertility control. In addition, these compounds are valuable intermediates for the production of 19-nor steroids, which are known active progestational agents.

Several methods have been described in the literature for the production of ring A aromatic steroids starting from the $\Delta^{1,4}$-3-keto or $\Delta^{1,4,6}$-3-keto compounds, by thermal degradation [H. H. Inhoffen, Angew. Chem. 53, 471 (1940)], by pyrolysis in a mineral oil [C. Djerassi et al., J. Am. Chem. Soc. 72, 4534 (1950) and ibid. 73, 1523 (1951) and E. B. Hershberg et al., J. Org. Chem. 15, 292 (1950)]. However, due to the drastic conditions, the use of these methods is very limited because they cannot be applied to steroid compounds having substituents unstable to heat especially at temperatures around 600° C. Moreover, very low yields are obtained.

The aromatization of ring A in steroid compounds by means of acid has also been described by C. Djerassi et al., J. Am. Chem. Soc. 72, 4540 (1950); however, migration of the angular methyl group to ring A occurs in this case.

In accordance with the present invention the surprising discovery has been made that when a 3-hydroxy-$\Delta^{1(10),5}$-19-nor-steroid of the androstane, pregnane and sapogenin series is treated with an oxidizing agent, capable of oxidizing secondary alcohols to ketones, there are obtained the corresponding $\Delta^{1,3,5(10)}$-estratriene compounds, in very good yields, as illustrated by the following equation, wherein only rings A and B of the steroid molecule are represented:

In the above formulas, X represents hydrogen or an aliphatic hydrocarbon radical of up to 6 carbon atoms.

The starting materials used in the process of the present invention are the 3-hydroxy-$\Delta^{1(10),5}$-19-nor-steroids of the androstane, pregnane or sapogenin series, or the 6-substituted derivatives thereof which are obtained by lithium aluminum hydride reduction or treatment with a Grignard reagent of the 3-acyloxy-$\Delta^{5(10)}$-19-nor-6 keto steroids, followed by acid treatment of the 3,6-dihydroxy or 6-substituted 3,6-dihydroxy compounds, as described in our copending applications Serial Nos. 293,831 and 293,898, filed July 9, 1963.

The starting materials may have at C–17 a keto group, an acyloxy group, a 17β-hydroxyl group which may further possess a 17α-lower alkyl, alkenyl or alkinyl radical, a 17β-acetyl radical with or without a hydroxyl or acyloxy group at C–17α, or the dihydroxyacetone side chain protected as the 17,20;20,21-bismethylenedioxy derivative. There may further be other groups in the molecule of the starting compound which do not interfere with the reaction, such as for example, when there is a 17β-acetyl substituent, a double bond between C–16 and C–17, or a 16α,17α-diol, preferably protected as the acetonide; an 11-ketone or 11β-hydroxyl group particularly in the case of compounds having a 17-dihydroxyacetone side chain; a methyl group at 16α or 16β, etc.

As suitable starting materials, there can be used the following compounds:

$\Delta^{1(10),5}$-19-nor-androstadien-3β-ol-17-one,
17α-methyl-$\Delta^{1(10),5}$-19-nor-androstadiene-3β,17β-diol,
17α-vinyl-$\Delta^{1(10),5}$-19-nor-androstadiene-3β,17β-diol,
17α-ethinyl-$\Delta^{1(10),5}$-19-nor-androstadiene-3β,17β-diol,
6-methyl-$\Delta^{1(10),5}$-19-nor-androstadien-3β-ol-17-one,
6,17α-dimethyl-$\Delta^{1(10),5}$-19-nor-androstadiene-3β,17β-diol,
$\Delta^{1(10),5}$-19-nor-pregnadien-3β-ol-20-one,
16α-methyl-$\Delta^{1(10),5}$-19-nor-pregnadien-3β-ol-20-one,
16α,17α-isopropylidenedioxy-$\Delta^{1(10),5}$-19-nor-pregnadien-3β-ol-20-one,
17-acetate of $\Delta^{1(10),5}$-19-nor-pregnadien-3β,17α-diol-20-one,
17-acetate of 16α-methyl-$\Delta^{1(10),5}$-pregnadiene-3β,17α-diol-20-one,
$\Delta^{1(10),5}$-19-nor-pregnadiene-3β,17α-diol-20-one,
17,20;20,21-bismethylenedioxy-$\Delta^{1(10),5}$-19-nor-pregnadien-3β-ol,
17,20;20,21-bismethylenedioxy-$\Delta^{1(10),5}$-19-nor-pregnadien-3β-ol-11-one,
17,20;20,21-bismethylenedioxy-$\Delta^{1(10),5}$-19-nor-pregnadiene-3β,11β-diol,
6-methyl-17,20;20,21-bismethylenedioxy-$\Delta^{1(10),5}$-19-nor-pregnadien-3β-ol,
6-ethinyl-17,20;20,21-bismethylenedioxy-$\Delta^{1(10),5}$-19-nor-pregnadien-3β-ol and
$\Delta^{1(10),5}$-19-nor-22-isospirastadien-3β-ol.

As indicated hereinbefore, any oxidant capable of oxidizing secondary alcohols to ketones may be used in practicing the process of the present invention; the reaction conditions (amount of reagents, solvents, temperature, reaction period of time, etc.), depend on the oxidant used, but are in general no different than those conventionally used for the oxidation of secondary alcohols to ketones.

Among the reagents suitable for use in this process are Oppenauer reagents such as aluminum isopropoxide, aluminum t-butoxide and aluminum phenoxide; chromium trioxide in aqueous acetic acid, chromium trioxide-pyridine complex, a solution of chromium trioxide in acetone preferably about 8 N and in the presence of sulfuric acid, sodium or potassium dichromate in aqueous acetic acid, N-haloamides, N-haloimides and the like.

Where Oppenauer conditions are used the 3-hydroxy-$\Delta^{1(10),5}$-19-nor-steroid is treated with an excess of an aluminum alkoxide, in an organic solvent and in the presence of a hydrogen acceptor. The reaction is generally conducted at reflux temperature for a period of time in the order of 1 to 12 hours, however, it may be carried out at lower temperatures, for a prolonged period of time.

Among the aluminum alkoxides which can be used in this process are: aluminum isopropoxide, aluminum t-butoxide, aluminum phenoxide or any other alkoxide commercially available; chloromagnesium alkoxides or potassium-t-butoxide may also be employed as catalysts.

As hydrogen acceptors the preferred reagent used is cyclohexanone; however, other ketones may be used, such as acetone, methyl ethyl ketone, diethylketone, benzoquinone, etc. Organic solvents are preferably non polar solvents such as toluene, xylene, benzene, and the like.

In general, the conditions for the Oppenauer oxidation used in the novel method are those described by C. Djerassi in Organic Reactions, vol. VI, p. 207 (John Wiley and Sons, Inc.).

The transformations of $\Delta^{1(10),5}$-19-nor steroids into the corresponding ring A aromatic compounds using chromium trioxide as the oxidizing agent is effected under the usual reaction conditions. Thus, for example, there may be used from 1 to 2 molar equivalents of chromium trioxide, in aqueous acetic acid solution, at a temperature between 15 to 18° C., and for a period of time of 1 to 3 hours. An 8 N solution of chromic acid in acetone and in the presence of sulfuric acid (Jones' reagent) may also be employed.

The chromium trioxide-pyridine complex oxidation is conducted preferably at room temperature, for a period of time of between 6 to 24 hours. Potassium or sodium dichromate are used in acetic acid-benzene solution, at room temperature and for 15 to 24 hours.

When the reagents used in the novel method are the N-haloamides or N-haloimides, such as for example, N-bromoacetamide, or N-bromosuccinimide the reaction is preferably conducted in aqueous t-butanol solution and in the presence of pyridine, at low temperature, and for a period of time of 12 to 24 hours.

The following examples serve to illustrate the present invention, but are not intended to limit the scope thereof:

*Example I*

A solution of 5 g. of $\Delta^{1(10),5}$-19-nor-androstadien-3β-ol-17-one in 80 cc. of dry toluene and 15 cc. of cyclohexanone was dried by distilling off 10 cc. of the solvent. A solution of 5 g. of aluminum isopropoxide dissolved in 35 cc. of anhydrous toluene was then added and the mixture was refluxed for 45 minutes; 10 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. The residue was crystallized from acetone-hexane to produce 4.1 g. of estrone, identical to an authentic sample.

*Example II*

The preceding example was repeated but using aluminum t-butoxide instead of aluminum isopropoxide, to produce also estrone in similar yields.

*Example III*

In the method of Example I aluminum phenoxide was used instead of aluminum isopropoxide with the same results.

*Example IV*

From a mixture of 1 g. of $\Delta^{1(10),5}$-19-nor-androstadien-3β-ol-17-one, 60 cc. of anhydrous toluene and 6 g. of benzoquinone there were distilled 10 cc. to eliminate moisture. 1 g. of aluminum t-butoxide dissolved in 10 cc. of anhydrous toluene was then added and the mixture refluxed for 1 hour under anhydrous conditions. 5 cc. of acetic acid were then added and the toluene was eliminated by steam distillation, extracted with ethyl acetate and the organic extract washed with potassium hydroxide solution and water to neutral dried over anhydrous sodium sulfate and evaporated to dryness. Crystallization of the residue from acetone-hexane afforded also estrone in 75% yield.

*Example V*

In the method of Example I, acetone (100 cc.) was used instead of cyclohexanone and the reflux period was prolonged to 8 hours; following the above described technique for the isolation of the product there was obtained estrone in 78% yield.

Example VI

A solution of 2 g. of 17α-methyl-$\Delta^{1(10),5}$-19-nor-androstadiene-3β,17β-diol in 100 cc. of benzene and 50 cc. of acetone was dried by azeotrophic distillation of 15 cc. of solvent. 2 g. of aluminum isopropoxide dissolved in 40 cc. of anhydrous benzene were added and the mixture refluxed for 12 hours. It was then cooled, washed with dilute hydrochloric acid solution and water to neutral, dried and evaporated to dryness. The residue was crystallized from acetone-ether to produce 17α-methylestradiol.

Example VII

The preceding example was repeated but using methyl-ethyl-ketone instead of acetone to produce also 17α-methyl-estradiol in similar yield.

Example VIII

From a solution of 1 g. of 17α - ethinyl-$\Delta^{1(10),5}$-androstadiene - 3β,17β - diol in 50 cc. of anhydrous xylene and 10 cc. of cyclohexanone there were distilled 10 cc. to eliminate moisture. A solution of 1 g. of aluminum t-butoxide dissolved in 5 cc. of xylene was added dropwise and the solution was refluxed with slow distillation for an hour further. 5 cc. of acetic acid were added and the solvents eliminated by steam distillation. The product was collected by filtration, washed with water and crystallized from acetone-hexane, thus producing 17α-ethinyl-esteradiol identical to an authentic sample.

Example IX

In accordance with the method described in Example I, the compounds below mentioned (I), were converted into the corresponding aromatic compound (II):

| I | II |
|---|---|
| 17α-ethyl-$\Delta^{1(10),5}$-19-nor-androstadiene-3β,17β-diol. | 17α-ethyl-estradiol. |
| 17α-vinyl-$\Delta^{1(10),5}$-19-nor-androstadiene-3β,17β-diol. | 17α-vinyl-estradiol. |
| 6-methyl-$\Delta^{1(10),5}$-19-nor-androstadien-3β-ol-17-one. | 6α-methyl-estrone. |
| 6-ethinyl-$\Delta^{1(10),5}$-19-nor-androstadien-3β-ol-17-one. | 6α-ethinyl-estrone. |
| 6,17α-dimethyl-$\Delta^{1(10),5}$-19-nor-androstadiene-3β,17β-diol. | 6α,17α-dimethyl-estradiol. |
| 6-methyl-17α-vinyl-$\Delta^{1(10),5}$-19-nor-androstadiene-3β,17β-diol. | 6α-methyl-17α-vinyl-estradiol. |
| 6-propargyl-17α-methyl-$\Delta^{1(10),5}$-19-nor-androstadiene-3β,17β-diol. | 6α-propargyl-17α-methyl-estradiol. |
| 6,17α-diethinyl-$\Delta^{1(10),5}$-19-nor-androstadiene-3β,17β-diol. | 6α,17α-diethinyl-estradiol. |
| $\Delta^{1(10),5}$-19-nor-pregnadien-3β-ol-20-one. | $\Delta^{1,3,5(10)}$-19-nor-pregnatrien-3-ol-20-one. |
| 16α-methyl-$\Delta^{1(10),5}$-19-nor-pregnadien-3β-ol-20-one. | 16α-methyl-$\Delta^{1,3,5(10)}$-19-nor-pregnatrien-3-ol-20-one. |
| 16α,17α-isopropylidenedioxy-$\Delta^{1(10),5}$-19-nor-pregnadien-3β-ol-20-one. | 16α,17α-isopropylidenedioxy-$\Delta^{1,3,5(10)}$-19-nor-pregnatrien-3-ol-20-one. |
| 17,20;20,21-bismethylenedioxy-$\Delta^{1(10),5}$-19-nor-pregnadien-3β-ol. | 17,20;20,21-bismethylenedioxy-$\Delta^{1,3,5(10)}$-19-nor-pregnatrien-3-ol. |
| 6-methyl-$\Delta^{1(10),5}$-19-nor-pregnadien-3β-ol-20-one. | 6α-methyl-$\Delta^{1,3,5(10)}$-19-nor-pregnatrien-3-ol-20-one. |
| 6-methyl-17,20;20,21-bismethylenedioxy-$\Delta^{1(10),5}$-19-nor-pregnadien-3β-ol. | 6α-methyl-17,20;20,21-bismethylenedioxy-$\Delta^{1,3,5(10)}$-19-nor-pregnatrien-3-ol. |
| 6-vinyl-$\Delta^{1(10),5}$-19-nor-pregnadien-3β-ol-20-one. | 6α-vinyl-$\Delta^{1,3,5(10)}$-19-nor-pregnatrien-3-ol-20-one. |
| 6-ethinyl-$\Delta^{1(10),5}$-19-nor-pregnadien-3β-ol-20-one. | 6α-ethinyl-$\Delta^{1,3,5(10)}$-19-nor-pregnatrien-3-ol-20-one. |
| 6,16α-dimethyl-$\Delta^{1(10),5}$-19-nor-pregnadien-3β-ol-20-one. | 6α,16α-dimethyl-$\Delta^{1,3,5(10)}$-19-nor-pregnatrien-3-ol-20-one. |
| 6-methyl-16α,17α-isopropylidenedioxy-$\Delta^{1(10),5}$-19-nor-pregnadien-3β-ol-20-one. | 6α-methyl-16α,17α-isopropylidenedioxy-$\Delta^{1,3,5(10)}$-19-nor-pregnatrien-3-ol-20-one. |
| 17-acetate of $\Delta^{1(10),5}$-19-nor-pregnadiene-3β,17α-diol-20-one. | 17-acetate of $\Delta^{1,3,5(10)}$-19-nor-pregnatriene-3,17α-diol-20-one. |
| 17-acetate of 16α-methyl-$\Delta^{1(10),5}$-19-nor-pregnadiene-3β,17α-diol-20-one. | 17-acetate of 16α-methyl-$\Delta^{1,3,5(10)}$-19-nor-pregnatriene-3,17α-diol-20-one. |
| 17-acetate of 6-vinyl-16α-methyl-$\Delta^{1(10),5}$-19-nor-pregnadiene-3β,17α-diol-20-one. | 17-acetate of 6α-vinyl-16α-methyl-$\Delta^{1,3,5(10)}$-19-nor-pregnatriene-3,17α-diol-20-one. |
| $\Delta^{1(10),5}$-19-nor-22-isospirostadien-3β-ol. | $\Delta^{1,3,5(10)}$-19-nor-22-isospirostatrien-3-ol. |

Example X

In accordance with the method described in Example II, 1 g. of the 17-acetate of 16α-methyl-$\Delta^{1(10),5}$-19-nor-pregnadiene-3β,17α-diol-20-one was treated with aluminum t-butoxide in toluene solution and in the presence of cyclohexanone, to give the 17-acetate of 16α-methyl-$\Delta^{1,3,5(10)}$-19-nor - pregnatriene-3,17α-diol-20 - one, identical to the obtained in the preceding example.

A mixture of 500 mg. of the foregoing triene, 20 cc. of methanol and 100 mg. of potassium hydroxide previously dissolved in 1 cc. of water was refluxed for 1 hour, poured into water and the formed precipitate collected by filtration. There was thus obtained 16α-methyl-$\Delta^{1,3,5(10)}$-19-nor-pregnatriene-3,17α-diol-20-one.

Example XI

A solution of 2 g. of $\Delta^{1(10),5}$-19-nor-pregnadien-3β-ol-20-one in 40 cc. of pyridine was added to a mixture of 2 g. of chromium trioxide in 40 cc. of pyridine. The reaction mixture was kept at room temperature overnight. It was then diluted with ethyl acetate, filtered through celite and the filtrate washed well with water, dried and evaporated to dryness. The residue was crystallized from acetone-hexane, to produce $\Delta^{1,3,5(10)}$-19-nor-pregnatrien-3-ol-20-one, identical to that obtained in Example IX.

Example XII

A solution of 500 mg. of chromic acid in 5 cc. of 80% acetic acid was added dropwise to a stirred solution of 1 g. of the 17-acetate of $\Delta^{1(10),5}$-19-nor-pregnadiene-3β,17α-diol-20-one in 20 cc. of glacial acetic acid, while the temperature was maintained around 20° C. After 2 hours at room temperature, the mixture was poured into ice water and the formed precipitate collected, washed with water and recrystallized from methanol, thus giving the 17-acetate of $\Delta^{1,3,5(10)}$-19-nor-pregnatriene-3,17α-diol-20-one identical to that obtained by the method of Example I.

In the same manner starting from $\Delta^{1(10),5}$-19-nor-pregnadiene-3β,17α-diol-20-one there was obtained $\Delta^{1,3,5(10)}$-19-nor-pregnatriene-3,17α-diol-20-one.

Example XIII

A solution of 1 g. of $\Delta^{1(10),5}$-19-nor-androstadien-3β-ol-17-one in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.) until the color of the reagent persisted in the mixture. It was stirred for 4 hours further at 0–5° C. and diluted with water. The precipitate was collected, washed with water and dried under vacuum, to produce also estrone which was purified by crystallization from acetone-hexane.

Example XIV

By following the method described in the preceding example, 1 g. of 17,20;20,21-bismethylenedioxy-$\Delta^{1(10),5}$-19-nor-pregnadien-3β-ol was converted into 17,20;20-21-bismethylenedioxy-$\Delta^{1,3,5(10)}$-19-nor-pregnatrien-3-ol.

The foregoing compound was dissolved in 20 cc. of 60% formic acid and the resulting solution was heated on the steam bath for 1 hour, cooled, diluted with water and extracted with ethyl acetate; the extract was washed to neutral, dried and evaporated to dryness. Crystallization of the residue from acetone-ether gave $\Delta^{1,3,5(10)}$-19-nor-pregnatriene-3,17α,21-triol-20-one.

Example XV

The preceding example was repeated but using 17,20;-20,21 - bismethylenedioxy-$\Delta^{1(10),5}$-19-nor - pregnadiene-3β,11β-diol as starting material, thus producing successively 17,20;20,21 - bismethylenedioxy - $\Delta^{1,3,5(10)}$-19-norpregnatriene-3-ol-11-one and $\Delta^{1,3,5(10)}$-19-nor-pregnatriene-3,17α,21-triol-11,20-dione.

Example XVI

To a stirred solution of 1.5 g. of 17α-methyl-$\Delta^{1(10),5}$-19-nor-androstadiene-3β,17β-diol in 60 cc. of benzene there was added dropwise a solution of 2 g. of sodium dichromate dihydrate dissolved in 50 cc. of acetic acid maintaining the temperature between 15–18° C. The reaction mixture was kept at room temperature for 24 hours, diluted with ether, and the organic layer was washed with water, sodium carbonate solution and water to neutral, dried over anhydrous sodium sulfate and evaporated to dryness under reduced pressure. The residue was crystallized from acetone-hexane to produce 17α-metyl-estradiol, identical to the product obtained in Example VI.

Example XVII

To a cold solution of 1 g. of $\Delta^{1(10),5}$-19-nor-androstadiene-3β-ol-17-one in 10 cc. of t-butyl-alcohol, 1 cc. of water and 1 cc. of pyridine there were added 2 molar equivalents of N-bromoacetamide and the reaction mixture was kept at 0° C. overnight. It was then diluted with water, extracted with methylene chloride and the organic extract washed with dilute hydrochloric acid and water to neutral, dried over anhydrous sodium sulfate and evaporated to dryness. The residue was crystallized from acetone-hexane to produce also estrone in similar yields to those of the preceding examples.

Example XVIII

The preceding example was repeated but using N-bromosuccinimide instead of N-bromoacetamide with the same results.

Example XIX

To a solution of 2.5 g. of 6α-ethinyl-estrone in 10 cc. of acetone there was added a solution of 7 g. of potassium hydroxide in 5 cc. of water, and the stirred mixture was treated dropwise with 4 cc. of dimethyl sulfate. The reaction mixture was stirred for 45 minutes further, poured into a dilute hydrochloric acid solution and the formed precipitate collected by filtration. Crystallization from chloroform-methanol gave the pure 3-methoxy-6α-ethinyl-estrone.

In a similar manner, 6α,17α-dimethyl-estradiol, 6α-methyl-17α-vinyl-estradiol, 6α-propargyl - 17α - methyl-estradiol, $\Delta^{1,3,5(10)}$-19-nor-pregnatrien-3-ol-20 - one, 6α-methyl-$\Delta^{1,3,5(10)}$-19-nor-pregnatrien-3-ol - 20 - one, 16α-methyl-$\Delta^{1,3,5(10)}$-19-nor-pregnatrien-3-ol-20-one, 6α-vinyl-$\Delta^{1,3,5(10)}$-19-nor-pregnatrien-3-ol-20 - one and 6α-methyl-16α,17α-isopropylidenedioxy-$\Delta^{1,3,5(10)}$ - 19 - nor - pregnatrien-3-ol-20-one were converted into the corresponding 3-methyl ethers.

Example XX

In accordance with the method described in the preceding example, 1 g. of the 17,20;20,21-bismethylenedioxy $\Delta^{1,3,5(10)}$-19-nor-pregnatrien-3-ol was treated with dimethyl sulfate in acetone and in the presence of potassium hydroxide, to produce 3-methoxy-17,20;20,21-bismethylenedioxy $\Delta^{1,3,5(10)}$-19-nor-pregnatriene, which upon hydrolysis with 60% formic acid, in accordance with the method described in Example XIV, gave 3-methoxy-$\Delta^{1,3,5(10)}$-19-nor-pregnatriene-17α,21-diol-20-one.

Example XXI

A mixture of 500 mg. of 6α-ethinyl-estrone, 4 cc. of pyridine and 2 cc. of acetic anhydride was kept at room temperature for 4 hours, poured into ice water and the formed precipitate collected by filtration, washed with water and dried. Crystallization from acetone-hexane gave the acetate of 6α-ethinyl-estrone.

Example XXII

A solution of 2 g. of 6α,17α-dimethyl estradiol in 8 cc. of pyridine was treated with 4 cc. of benzoyl chloride and then heated on the steam bath for 1 hour. The mixture was then poured into ice water and the formed precipitate collected, washed with water and dried. Recrystallization from methylene chloride-hexane afforded the 3-benzoate of 6α,17α-dimethyl-estradiol.

Example XXIII

In accordance with the method described in Example XXI the compounds mentioned below under I were treated with the indicated acid anhydride, to produce the respective mono- or di-esters II:

| I | Anhydride | II |
|---|---|---|
| 6α-methyl-17α-vinylestradiol | Propionic | 3-propionate of 6α-methyl-17α-vinyl-estradiol. |
| 6α-propargyl-17α-methyl-estradiol | Caproic | 3-caproate of 6α-propargyl-17α-methyl-estradiol. |
| 6α,17α-diethinyl-estradiol | Acetic | 3-acetate of 6α,17α-diethinyl-estradiol. |
| $\Delta^{1,3,5(10)}$-19-nor-pregnatrien-3-ol-20-one. | Acetic | Acetate of $\Delta^{1,3,5(10)}$-19-nor-pregnatrien-3-ol-20-one. |
| 16α-methyl-$\Delta^{1,3,5(10)}$-19-nor-pregnatrien-3-ol-20-one. | Cyclopentyl-propionic. | Cyclopentylpropionate of 16α-methyl-$\Delta^{1,3,5(10)}$-19-nor-pregnatrien-3-ol-20-one. |
| 6α-methyl-$\Delta^{1,3,5(10)}$-19-nor-pregnatrien-3-ol-20-one. | Acetic | Acetate of 6α-methyl-$\Delta^{1,3,5(10)}$-19-nor-pregnatrien-3-ol-20-one. |
| 6α-ethinyl-$\Delta^{1,3,5(10)}$-19-nor-pregnatrien-3-ol-20-one. | Enanthic | Enanthate of 6α-ethinyl-$\Delta^{1,3,5(10)}$-19-nor-pregnatrien-3-ol-20-one. |
| 6α-methyl-16α,17α-isopropylidenedioxy-$\Delta^{1,3,5(10)}$-19-nor-pregnatrien-3-ol-20-one. | Caproic | Caproate of 6α-methyl-16α,17α-isopropylidene-dioxy-$\Delta^{1,3,5(10)}$-19-nor-pregnatrien-3-ol-20-one. |
| $\Delta^{1,3,5(10)}$-19-nor-pregnatriene-3,17α-diol-20-one. | Propionic | 3-propionate of $\Delta^{1,3,5(10)}$-19-nor-pregnatriene-3,17α-diol-20-one. |
| 17-acetate of $\Delta^{1,3,5(10)}$-19-nor-pregnatriene-3,17α-diol-20-one. | Caproic | 17-acetate 3-caproate of $\Delta^{1,3,5(10)}$-19-nor-pregnatriene-3,17α-diol-20-one. |
| $\Delta^{1,3,5(10)}$-19-nor-pregnatriene-3,17α,21-triol-20-one. | Acetic | 3,21-diacetate of $\Delta^{1,3,5(10)}$-19-nor-pregnatriene-3,17α,21-triol-20-one. |
| $\Delta^{1,3,5(10)}$-19-nor-pregnatriene-3,17α,21-triol-11,20-dione. | Propionic | 3,21-dipropionate of $\Delta^{1,3,5(10)}$-19-nor-pregnatriene-3,17α,21-triol-11,20-dione. |
| 3-methoxy-$\Delta^{1,3,5(10)}$-19-nor-pregnatriene-17α,21-diol-20-one. | Acetic | 21-acetate of 3-methoxy-$\Delta^{1,3,5(10)}$-19-nor-pregnatriene-17α,21-diol-20-one. |

Example XXIV

To a solution of 1 g. of 6α-methyl-17α-vinyl-estradiol in 30 cc. of anhydrous benzene there were added 200 mg. of p-toluenesulfonic acid and 4 cc. of acetic anhydride, and the reaction mixture was kept at room temperature for 24 hours, poured into ice water and the resulting mixture stirred to effect the hydrolysis of the excess anhydride. The benzene layer was separated and washed with 10% sodium carbonate solution and water. Drying, evaporation and crystallization of the residue from ether-hexane afforded the diacetate of 6α-methyl-17α-vinyl-estradiol.

By the same method the compounds below mentioned under I were treated with the indicated anhydride, thus yielding the products under II:

| I | Anhydride | II |
|---|---|---|
| 6α,17α-diethinyl-estradiol | Propionic | Dipropionate of 6α,17α-diethinyl-estradiol. |
| $\Delta^{1,3,5(10)}$-19-nor-pregnatriene-3,17α-diol-20-one. | Acetic | Diacetate of $\Delta^{1,3,5(10)}$-19-nor-pregnatriene-3,17α-diol-20-one. |
| 6,17α-dimethyl-estradiol | Caproic | Dicaproate of 6,17α-dimethyl-estradiol. |
| 3-propionate of 6α-methyl-17α-vinyl-estradiol. | Enanthic | 3-propionate, 17-enanthate of 6α-methyl-17α-vinyl-estradiol. |
| 3-methoxy-6α,17α-dimethyl-estradiol. | Cyclopentyl-propionic. | Cyclopentylpropionate of 3-methoxy 6α-17α-dimethyl-estradiol. |
| 3-methoxy-6α-methyl-17α-vinyl-estradiol. | Acetic | Acetate of 3-methoxy-6α-methyl-17α-vinyl-estradiol. |

*Example XXV*

In accordance with the method described in Example I, 5 g. of 17,20;20,21-bismethylenedioxy-6-ethinyl-$\Delta^{1(10),5}$-19-nor-pregnadiene-3β-ol were converted into 17,20;20,21- bismethylenedioxy - 6α - ethinyl - $\Delta^{1,3,5(10)}$-19-nor-pregnatrien-3-ol.

The preceding compound was then submitted to the reactions described in Example XX to give 3-methoxy-6α - ethinyl - $\Delta^{1,3,5(10)}$ - 19 - nor - pregnatriene - 17α,21-diol-20-one.

Esterification of this compound with acetic, caproic and cyclopentylpropionic anhydrides in pyridine solution afforded the 21-acetate, 21-caproate and 21-cyclopentylpropionate of 3-methoxy-6α-ethinyl-$\Delta^{1,3,5(10)}$-19-nor-pregnatriene-17α,21-diol-20-one.

We claim:

1. A process for the production of 3-hydroxy-ring A aromatic steroids selected from the group consisting of the androstane, pregnane and sapogenin series which comprises reacting a 3-hydroxy-$\Delta^{1(10),5}$-19-nor steroid selected from the group consisting of the androstane, pregnane and sapogenin series with an oxidizing agent capable of oxidizing secondary alcohols to ketones.

2. A process for the production of 3-hydroxy-ring A aromatic steroids selected from the group consisting of the androstane, pregnane and sapogenin series which comprises reacting a 3-hydroxy-$\Delta^{1(10),5}$-19-nor steroid selected from the group consisting of the androstane, pregnane and sapogenin series with an aluminum alkoxide in the presence of a hydrogen acceptor.

3. The process of claim 2 wherein the reagent used is aluminum isopropoxide in toluene solution and in the presence of cyclohexanone.

4. The process of claim 2 wherein the aluminum alkoxide is aluminum t-butoxide.

5. The process of claim 2 wherein the aluminum alkoxide is aluminum phenoxide.

6. The process of claim 2 wherein the hydrogen acceptor is acetone.

7. The process of claim 2 wherein the hydrogen acceptor is benzoquinone.

8. The process of claim 1 wherein the oxidizing agent is chromium-trioxide in aqueous acetic acid.

9. The process of claim 1 wherein the oxidizing agent is the chromium-trioxide-pyridine complex.

10. The process of claim 1 wherein the oxidizing agent is an 8N solution of chromium trioxide in acetone and in the presence of sulfuric acid.

11. The process of claim 1 wherein the oxidizing agent is sodium dichromate.

12. The process of claim 1 wherein the oxidizing agent is N-bromoacetamide.

13. The process of claim 1 wherein the oxidizing agent is N-bromo-succinimide.

14. A compound of the following formula:

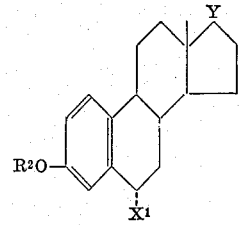

wherein Y is selected from the group consisting of keto and the grouping

R is selected from the group consisting of hydrogen and a hydrocarbon carboxylic acyl radical of less than 12 carbon atoms; $R^1$ is selected from the group consisting of hydrogen, lower alkyl, lower alkenyl and lower alkinyl; $R^2$ is selected from the group consisting of hydrogen, lower alkyl and a lower acyl group; and $X^1$ is selected from the group consisting of lower alkyl, lower alkenyl and lower alkinyl radicals of 2 to 6 carbon atoms.

15. 6α-vinyl estradiol.
16. 6α-ethinyl estradiol.
17. 6α-vinyl-estrone.
18. 6α-ethinyl-estrone.
19. A compound of the following formula:

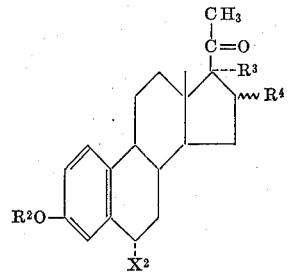

wherein $R^2$ is selected from the group consisting of hydrogen, a lower alkyl group and an acyl group of less than 12 carbon atoms; $R^3$ is selected from the group consisting of hydrogen, hydroxy and a hydrocarbon carboxylic acyloxy group of less than 12 carbon atoms; $R^4$ is selected from the group consisting of hydrogen, α-methyl, β-methyl, α-hydroxy and α-acyloxy; $R^3$ and $R^4$ together represent the grouping

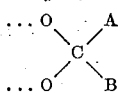

wherein A is selected from the group consisting of hydrogen and a lower alkyl radical and B is selected from the group consisting of lower alkyl, aryl and aralkyl radicals; and $X^2$ is selected from the group consisting of lower alkyl, lower alkenyl and lower alkinyl radicals of up to 6 carbon atoms.

20. A compound of the following formula:

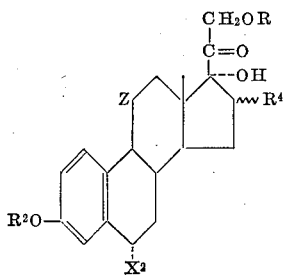

wherein R is selected from the group consisting of hydrogen and a hydrocarbon carboxylic acyl radical of less than 12 carbon atoms; $R^2$ is selected from the group consisting of hydrogen, a lower alkyl group and an acyl group of less than 12 carbon atoms; $R^4$ is selected from the group consisting of hydrogen, α-methyl, β-methyl, α-hydroxy and α-acyloxy; $R^4$ together with the hydroxyl group at C–17 represent the grouping

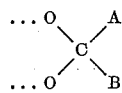

wherein A is selected from the group consisting of hydrogen and a lower alkyl radical and B is selected from the group consisting of lower alkyl, aryl and aralkyl radicals; $X^2$ is selected from the group consisting of lower alkyl, lower alkenyl and lower alkinyl radicals of up to 6 carbon atoms; and Z is selected from the group consisting of hydrogen, β-hydroxy and keto.

No references cited.

LEWIS GOTTS, *Primary Examiner.*
ELBERT L. ROBERTS, *Examiner.*